(12) United States Patent
Jadhav et al.

(10) Patent No.: US 12,502,518 B2
(45) Date of Patent: Dec. 23, 2025

(54) FLUID CONNECTOR SYSTEM

(71) Applicant: CareFusion 303, Inc., San Diego, CA (US)

(72) Inventors: Amarsinh Deeliprao Jadhav, Bangalore (IN); Sumit Rajpal, Panipat (IN); Kaushik Suman, Jharkhand (IN); Kanjimpuredathil Muralikrishna Menon, Bangalore (IN); Mohammed Mehtab Khan, Bengaluru (IN)

(73) Assignee: CAREFUSION 303, INC., San Diego, CA (US)

( * ) Notice: Subject to any disclaimer, the term of this patent is extended or adjusted under 35 U.S.C. 154(b) by 159 days.

(21) Appl. No.: 18/166,968

(22) Filed: Feb. 9, 2023

(65) Prior Publication Data

US 2023/0321425 A1 Oct. 12, 2023

Related U.S. Application Data

(60) Provisional application No. 63/328,701, filed on Apr. 7, 2022.

(51) Int. Cl.
*A61M 39/22* (2006.01)
(52) U.S. Cl.
CPC .................................. *A61M 39/22* (2013.01)
(58) Field of Classification Search
CPC .................. A61M 39/22; A61M 39/26; A61M 2039/267; A61M 2039/268
See application file for complete search history.

(56) References Cited

U.S. PATENT DOCUMENTS

| 5,713,856 A | 2/1998 | Eggers et al. |
| 6,874,522 B2 | 4/2005 | Anderson et al. |

(Continued)

FOREIGN PATENT DOCUMENTS

| EP | 1678070 A2 | 7/2006 |
| EP | 1517723 B1 | 1/2007 |

(Continued)

OTHER PUBLICATIONS

Bangert, Bill, "Shorter times to blood transfusion associated with decreased death risk in trauma patients", Medical Xpress, Apr. 14, 2016, https://medicalxpress.com/news/2016-04-shorter-blood-transfusion-decreased-death.html.

(Continued)

*Primary Examiner* — Reinaldo Sanchez-Medina
(74) *Attorney, Agent, or Firm* — MASCHOFF BRENNAN (57) ABSTRACT

Fluid connector systems that can include first and second valve assemblies that are couplable together to form a fluid pathway through the fluid connector system when the first and second valve assemblies are coupled together, and can resist fluid flow through each of the first and second valve assemblies when the first and second valve assemblies are separated from each other, where the first and second valve assemblies can include a compressible element or post positioned within a channel and configured resist fluid flow through the respective first or second valve assembly in a first position and to reduce the resistance to fluid flow through the first or second valve assembly in a second position, and the first and second valve assemblies including a sleeve and one or more arm configured to engage each other to form a snap fitting feature that can resist separation therebetween.

20 Claims, 8 Drawing Sheets

(56) References Cited

U.S. PATENT DOCUMENTS

| | | |
|---|---|---|
| 7,004,934 B2 | 2/2006 | Vaillancourt |
| 7,040,598 B2 | 5/2006 | Raybuck |
| 7,137,654 B2 * | 11/2006 | Segal .................. F16L 37/248 |
| | | 285/376 |
| 7,153,296 B2 | 12/2006 | Mitchell |
| 7,350,764 B2 | 4/2008 | Raybuck |
| 7,396,051 B2 | 7/2008 | Baldwin et al. |
| 7,763,013 B2 | 7/2010 | Baldwin et al. |
| 7,766,394 B2 | 8/2010 | Sage et al. |
| 7,794,675 B2 | 9/2010 | Lynn |
| 7,803,139 B2 | 9/2010 | Fangrow, Jr. |
| 7,803,140 B2 | 9/2010 | Fangrow, Jr. |
| 7,815,614 B2 | 10/2010 | Fangrow, Jr. |
| 7,918,243 B2 | 4/2011 | Diodati et al. |
| 7,998,134 B2 | 8/2011 | Fangrow et al. |
| 8,123,738 B2 | 2/2012 | Vaillancourt |
| 8,142,418 B2 | 3/2012 | Mcmichael et al. |
| 8,211,069 B2 | 7/2012 | Fangrow, Jr. |
| 8,262,628 B2 | 9/2012 | Fangrow, Jr. |
| 8,361,408 B2 | 1/2013 | Lynn |
| 8,480,968 B2 | 7/2013 | Lynn |
| 8,777,908 B2 | 7/2014 | Fangrow, Jr. |
| 8,777,909 B2 | 7/2014 | Fangrow, Jr. |
| 8,795,256 B1 | 8/2014 | Smith |
| 8,888,758 B2 | 11/2014 | Mansour |
| 8,899,267 B2 | 12/2014 | Diodati et al. |
| 8,910,919 B2 | 12/2014 | Bonnal et al. |
| 8,974,425 B2 | 3/2015 | Tachizaki et al. |
| 8,974,437 B2 | 3/2015 | Williams et al. |
| 9,039,047 B2 * | 5/2015 | Imai .................. A61J 1/2096 |
| | | 285/402 |
| 9,114,242 B2 | 8/2015 | Fangrow et al. |
| 9,126,028 B2 | 9/2015 | Fangrow et al. |
| 9,126,029 B2 | 9/2015 | Fangrow et al. |
| 9,192,753 B2 | 11/2015 | Lopez et al. |
| 9,234,616 B2 | 1/2016 | Carrez et al. |
| 9,358,379 B2 | 6/2016 | Fangrow, Jr. |
| 9,433,769 B2 | 9/2016 | Bayly |
| 9,468,749 B2 | 10/2016 | Mansour et al. |
| 9,492,649 B2 | 11/2016 | Carrez et al. |
| 9,636,492 B2 | 5/2017 | Fangrow, Jr. |
| 9,724,504 B2 | 8/2017 | Fangrow, Jr. et al. |
| 9,724,505 B2 | 8/2017 | Williams et al. |
| 9,861,805 B2 | 1/2018 | Dennis et al. |
| 9,933,094 B2 | 4/2018 | Fangrow |
| 9,974,939 B2 | 5/2018 | Fangrow, Jr. |
| 9,974,940 B2 | 5/2018 | Fangrow, Jr. |
| 10,029,086 B2 | 7/2018 | Nowak et al. |
| 10,156,306 B2 | 12/2018 | Fangrow |
| 10,173,045 B2 | 1/2019 | Mansour |
| 10,179,203 B1 | 1/2019 | Huslage et al. |
| 10,315,025 B2 | 6/2019 | Phillips et al. |
| 10,398,887 B2 | 9/2019 | Fangrow, Jr. et al. |
| 10,441,507 B2 | 10/2019 | Sanders |
| 10,518,078 B2 | 12/2019 | Stjernberg Bejhed et al. |
| 10,569,073 B2 | 2/2020 | Hallisey et al. |
| 10,625,068 B2 | 4/2020 | Leuthardt et al. |
| 10,655,768 B2 | 5/2020 | Jones et al. |
| 10,697,570 B2 | 6/2020 | Fangrow |
| 10,744,315 B2 | 8/2020 | Sanders |
| 10,842,982 B2 | 11/2020 | Fangrow, Jr. |
| 10,857,346 B2 | 12/2020 | Dennis et al. |
| 10,864,362 B2 | 12/2020 | Jones et al. |
| 10,881,847 B2 | 1/2021 | Lynn |
| 11,168,818 B2 | 11/2021 | Fangrow |
| 11,207,514 B2 | 12/2021 | Kakinoki |
| 11,235,135 B2 | 2/2022 | Tsai |
| 11,273,297 B2 | 3/2022 | Kakinoki |
| 11,484,471 B2 | 11/2022 | Sanders |
| 11,491,084 B2 | 11/2022 | Ueda et al. |
| 12,048,827 B2 * | 7/2024 | Kopp .................. A61M 39/10 |
| 2004/0215158 A1 | 10/2004 | Anderson |
| 2005/0090805 A1 | 4/2005 | Shaw et al. |
| 2006/0129109 A1 | 6/2006 | Shaw et al. |
| 2007/0088292 A1 | 4/2007 | Fangrow, Jr. |
| 2007/0088293 A1 | 4/2007 | Fangrow, Jr. |
| 2007/0088294 A1 | 4/2007 | Fangrow, Jr. |
| 2007/0225635 A1 | 9/2007 | Lynn |
| 2008/0039803 A1 | 2/2008 | Lynn |
| 2008/0197626 A1 * | 8/2008 | Coambs .................. A61M 39/26 |
| | | 285/330 |
| 2011/0106046 A1 | 5/2011 | Hiranuma |
| 2012/0277688 A1 | 11/2012 | Rogier |
| 2014/0209197 A1 * | 7/2014 | Carrez .................. F16L 29/005 |
| | | 137/798 |
| 2014/0246616 A1 * | 9/2014 | Fangrow .................. F16L 29/00 |
| | | 251/148 |
| 2014/0249487 A1 | 9/2014 | Lynn |
| 2014/0330254 A1 | 11/2014 | Rosenberger et al. |
| 2016/0000363 A1 | 1/2016 | Jones et al. |
| 2018/0200147 A1 | 7/2018 | Sanders |
| 2019/0184152 A1 | 6/2019 | Kakinoki |
| 2019/0282797 A1 | 9/2019 | Tsai |
| 2020/0113784 A1 | 4/2020 | Lopez et al. |
| 2020/0179672 A1 | 6/2020 | Kakinoki |
| 2020/0215319 A1 | 7/2020 | Fangrow, Jr. et al. |
| 2020/0284385 A1 | 9/2020 | Fangrow |
| 2020/0323734 A1 | 10/2020 | Ueda et al. |
| 2020/0338331 A1 | 10/2020 | Sanders |
| 2021/0069484 A1 | 3/2021 | Tsai |
| 2021/0077803 A1 | 3/2021 | Lynn |
| 2021/0252267 A1 | 8/2021 | Fangrow, Jr. |
| 2021/0388926 A1 | 12/2021 | Martin et al. |
| 2021/0393938 A1 | 12/2021 | Lynn et al. |
| 2022/0260189 A1 | 8/2022 | Deuse |
| 2022/0282814 A1 | 9/2022 | Fangrow |

FOREIGN PATENT DOCUMENTS

| | | |
|---|---|---|
| EP | 1622675 B1 | 8/2009 |
| EP | 2144634 A1 | 1/2010 |
| EP | 2298407 A1 | 3/2011 |
| EP | 2694132 A1 | 2/2014 |
| EP | 2562456 B1 | 6/2014 |
| EP | 2782633 A1 | 10/2014 |
| EP | 1842002 B1 | 4/2015 |
| EP | 2736582 B1 | 5/2015 |
| EP | 2089094 B1 | 1/2016 |
| EP | 2219721 B1 | 12/2017 |
| EP | 2753396 B1 | 12/2017 |
| EP | 2736584 B1 | 4/2018 |
| EP | 3305361 A1 | 4/2018 |
| EP | 2271398 B1 | 11/2018 |
| EP | 2480281 B1 | 11/2018 |
| EP | 2790750 B1 | 11/2018 |
| EP | 2331191 B1 | 3/2019 |
| EP | 3079756 B1 | 3/2019 |
| EP | 2121114 B1 | 5/2019 |
| EP | 2719419 B1 | 5/2019 |
| EP | 2956204 B1 | 8/2019 |
| EP | 3421077 B1 | 8/2019 |
| EP | 3530313 A1 | 8/2019 |
| EP | 3538201 A1 | 9/2019 |
| EP | 3570807 A1 | 11/2019 |
| EP | 3570809 A1 | 11/2019 |
| EP | 2536463 B1 | 4/2020 |
| EP | 3381505 B1 | 5/2020 |
| EP | 3538201 B1 | 5/2020 |
| EP | 1904152 B1 | 12/2020 |
| EP | 2150307 B1 | 12/2020 |
| EP | 3313490 B1 | 1/2021 |
| EP | 3760275 A1 | 1/2021 |
| EP | 3851155 A1 | 7/2021 |
| EP | 3517164 B1 | 9/2021 |
| EP | 3954355 A1 | 2/2022 |
| EP | 3960229 A1 | 3/2022 |
| EP | 3973044 A1 | 3/2022 |
| EP | 3305361 B1 | 5/2022 |
| EP | 3134052 B1 | 8/2022 |
| EP | 3530313 B1 | 8/2022 |
| WO | WO-2006078355 A1 | 7/2006 |
| WO | WO-2019171371 A1 | 9/2019 |
| WO | WO-2021099437 A1 | 5/2021 |
| WO | WO-2021180675 A1 | 9/2021 |

(56) References Cited

FOREIGN PATENT DOCUMENTS

| WO | WO-2021252197 A1 | 12/2021 |
| WO | WO-2022042956 A1 | 3/2022 |
| WO | WO-2022149339 A1 | 7/2022 |
| WO | WO-2022207560 A1 | 10/2022 |

OTHER PUBLICATIONS

Ivteam, "Force-activated separation IV connectors", 2022, Retrieved from the internet https://www.ivteam.com/intravenous-literature/force-activated-separation-iv-connectors/ [Last retrieved Jan. 13, 2023].

Lineus Medical, SafeBreak Product Features and Benefits Brochure, May 2021, mkg 0058 May 2021 Rev. 02.

Przen, "Lineus Medical Goes International, Signs Oney for Distribution in Korea", PRZen Online Press Release Distribution, PrZen/33448014, MKG-0130 Rev 00, Retrieved from the internet https://przen.com/pr/lineus-medical-goes-international-signs-oney-for-distribution-in-korea-przen-33448014 [Last retrieved Jan. 13, 2023].

Rickard, et al., "Securing All intraVenous devices Effectively in hospitalised patients—the SAVE trial: study protocol for a multicentre randomised controlled trial", BMJ Open, Sep. 23, 2015;5(9):e008689, doi: 10.1136/bmjopen-2015-008689. PMID: 26399574; PMCID: PMC4593168.

Tada Group AB, LinkedIn Post "ReLink granted patent in Japan", LinkedIn, Mar. 2022, retrieved from the internet https://se.linkedin.com/company/tadamedical?trk=public_post_reshare_feed-actor-image&original_referer= [Last retrieved Mar. 2022].

International Search Report and Written Opinion for Application No. PCT/US2023/014124, dated Jun. 12, 2023, 15 pages.

\* cited by examiner

FLUID CONNECTOR SYSTEM

CROSS-REFERENCE TO RELATED APPLICATIONS

This application claims the benefit of U.S. Provisional Application No. 63/328,701, titled "FLUID CONNECTOR SYSTEM," filed Apr. 7, 2022, the disclosure of which is incorporated herein by reference in its entirety.

BACKGROUND

The present disclosure relates generally to medical fluid connectors and, more particularly, to fluid connector systems having valve assemblies that can be coupled together to form a fluid pathway.

Medical connections are widely used in fluid delivery systems such as those used in connection with intravenous (IV) fluid lines, blood access, hemodialysis, peritoneal dialysis, enteral feeding, drug vial access, and other procedures.

In some instances, the medical connection can become dislodged or disconnected in an unintended manner. For example, medical tubing of an IV set that is coupled to a catheter can become dislodged when an unintended or unexpected forces is exerted upon the catheter, which may exceed the design limitations of the catheter securement method. An unintended or unexpected force can be applied to the tubing and/or catheter when the patient moves or rolls over within a bed, or when the tubing or another portion of an intravenous set become caught on a portion of the bed, such as the railing, or when a patient is panicking, disoriented, or fidgeting to such an extent that the medical tubing is unintentionally or intentionally pulled away from the patient or away from the medical equipment coupled to the tubing.

SUMMARY

In accordance with at least some embodiments disclosed herein is the realization that unintended dislodgement or disconnection of a medical connection, such as a medical fluid line, can result in injury to a patient or a caregiver, such as by depriving the patient of a medicament, increasing the potential for infection to the patient, and exposing the caregiver to harmful medicaments.

Accordingly, aspects of the present disclosure provide a fluid connector system comprising a first valve assembly comprising a housing having a first port, a second port, an inner surface forming a channel that extends between the first and second ports, and a sleeve that extends from an outer surface of the housing, the sleeve having an inner surface comprising a ridge that extends in a direction toward the housing and a valve element having a base and a head, wherein the valve element is positioned within the channel such that the head obstructs the channel through the first port when the first valve assembly is in a closed configuration, and the head is moved away from the first port, in a direction toward the second port, to permit a fluid flow through the channel when the first valve assembly is in an open configuration, a second valve assembly comprising a body having a first port, a second port, an inner surface forming a channel that extends between the first and second ports, and one or more arm that extends from the body, the one or more arm having an outer surface comprising a protrusion that extends in a direction away from the outer surface of the body; a post positioned in the channel and movable between the first and second ports, and a biasing element positioned between the post and the second port, such that the post is urged toward the first port to obstructs the channel through the first port when the second valve assembly is in a closed configuration, and the post is moved away from the first port, in a direction toward the second port, to compress the biasing element and permit a fluid flow through the channel when the second valve assembly is in an open configuration wherein, when the first and second valve assemblies are coupled together, the one or more arm is positioned between the inner surface of the sleeve and the outer surface of the body, and the protrusion is positioned between the ridge and the second port of the first valve assembly, such that engagement of the protrusion against the ridge resists separation of the first and second valve assemblies.

In some instances, the present disclosure provides fluid connector system comprising a first valve assembly comprising a housing having a first port, a second port, an inner surface forming a channel that extends between the first and second ports, and a sleeve extending along and spaced apart from an outer surface of the housing, and a valve positioned in the channel and configured to obstruct a portion of the channel through the first port, and a second valve assembly comprising a body having a first port, a second port, an inner surface forming a channel that extends between the first and second ports, and one or more arm that extends from the body, the one or more arm having an outer surface comprising a protrusion that extends in a direction away from the outer surface of the body.

In some instances, the present disclosure provides methods of providing a fluid connector system, the method comprising providing a first valve assembly comprising a housing having a first port, a second port, an inner surface forming a channel that extends between the first and second ports, and a sleeve that extends from an outer surface of the housing, providing a second valve assembly comprising a body having a first port, a second port, an inner surface forming a channel that extends between the first and second ports, and one or more arm that extends from the body; and moving the first and second valve assemblies toward each other such that the first port of the first valve assembly engages against the first port of the second valve assembly, and the one or more arm of the body is inserted between the outer surface of the housing and the sleeve.

Accordingly, the present application addresses several operational challenges encountered in prior fluid connections and provides numerous improvements that enable the user to increase safety and efficacy, while more easily and precisely providing fluid connections.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE DRAWINGS

Various features of illustrative embodiments of the inventions are described below with reference to the drawings.

The illustrated embodiments are intended to illustrate, but not to limit, the inventions. The drawings contain the following figures.

DETAILED DESCRIPTION

In the following detailed description, numerous specific details are set forth to provide a full understanding of the subject technology. It should be understood that the subject technology may be practiced without some of these specific details. In other instances, well-known structures and techniques have not been shown in detail so as not to obscure the subject technology.

Further, while the present description sets forth specific details of various embodiments, it will be appreciated that the description is illustrative only and should not be construed in any way as limiting. Additionally, it is contemplated that although particular embodiments of the present disclosure may be disclosed or shown in the context of an IV set, such embodiments can be used in other fluid conveyance systems. Furthermore, various applications of such embodiments and modifications thereto, which may occur to those who are skilled in the art, are also encompassed by the general concepts described herein.

In accordance with some embodiments, the present application discloses various features and advantages of a fluid connector system. The fluid connector system can provide for efficient and safe maintenance of fluid connections, such as the connections used for transferring medical fluids toward or away from a patient. The fluid connector system can maintain a fluid pathway by resisting unintended disconnection when a pulling or tension force is applied to the fluid connector system, such as when a patient moves or when the medical tubing is pulled away from the patient.

The fluid connector system can also prevent injury to a patient or a caregiver by permitting disconnection or separation between portions of the connector system when a pulling or tension force exceeds a threshold. The fluid connector system can also prevent injury to a patient or a caregiver by obstructing the fluid pathway when disconnection or separation between portions of the connector system occurs. Further, the fluid connector system can provide for efficient and safe reestablishment of the fluid pathway, by permitting reassembly of portions of the system after a disconnection or separation occurs.

Figure 1:
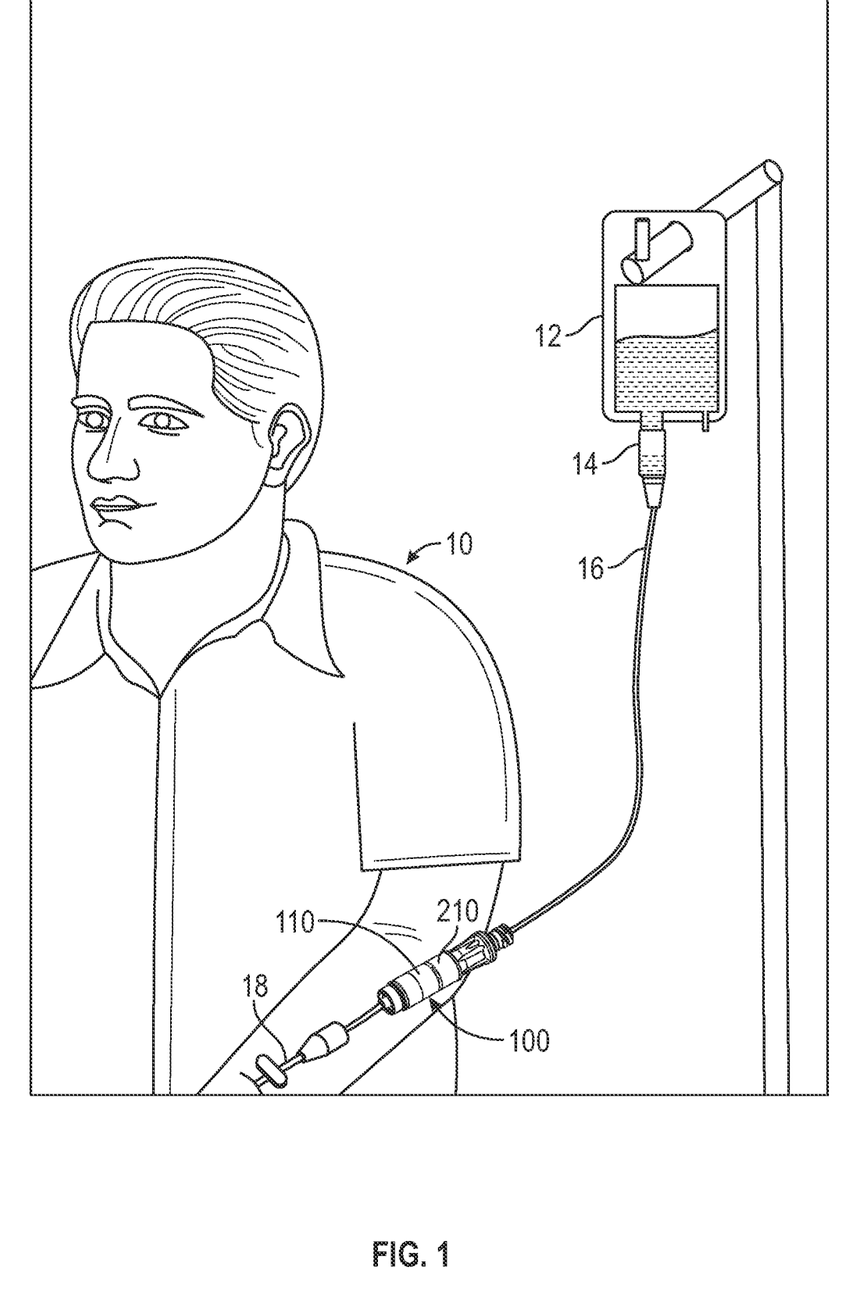
FIG. 1 illustrates a fluid connector system in use with an IV set coupled to a patient, in accordance with aspects of the present disclosure.

Referring now to the figures, FIG. 1 illustrates an example of a fluid connector system in use in accordance with aspects of the present disclosure. The fluid connector system 100 is coupled with tubing of an IV set, which is being used to direct a fluid to a patient 10. The IV set can include a medicament bag 12, a drip chamber 14, tubing 16, and an IV catheter 18.

The fluid connector system 100 couples the tubing 16 to the IV catheter 18 so that a fluid can move between the tubing 16 and the IV catheter 18 by flowing through the fluid connector system 100. Although the fluid connector system 100 is illustrated being coupled along a fluid pathway of an IV set, between a medicament bag 12 and a patient 10, it should be understood that the fluid connector system 100 can be connected within other fluid pathways, such as between a patient and a IV pump or between a patient and a dialysis machine. The fluid connector system 100 can also be connected along another portion of a fluid pathway. For example, the fluid connector system 100 can be connected along a proximal portion of the fluid pathway, such as being connected between the tubing 16 and the medicament bag 12 or other fluid therapy device.

Figure 2:
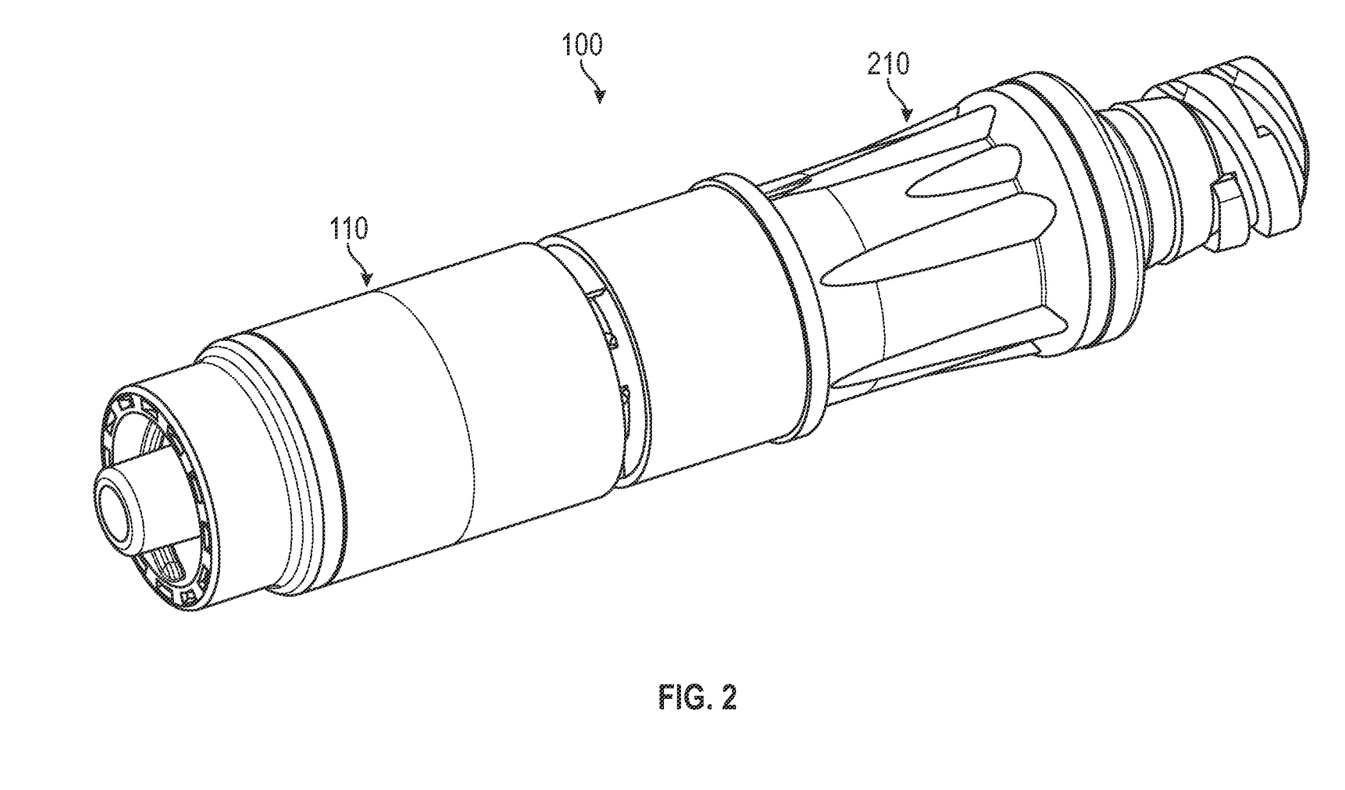
FIG. 2 illustrates a perspective view of a fluid connector system, in accordance with aspects of the present disclosure.

The fluid connector system 100 includes a first valve assembly 110 and a second valve assembly 210, which are illustrated in FIG. 2. The first and second valve assemblies 110, 210 can be coupled together by inserting a portion of the second valve assembly 210 into the first valve assembly 110. When the first valve assembly 110 and the second valve assembly 210 coupled together, a fluid pathway is formed through the fluid connector system 100.

The first and second valve assemblies 110, 210 resist unintended separation from each other. However, if any of the first valve assembly 110 and the second valve assembly 210 are separated from each other, such as when a pulling or tension force on the fluid connector system 100 exceeds a threshold, the first valve assembly 110 and the second valve assembly 210 can separate from each other. In some embodiments of the present disclosure, the threshold force for separating the first and second valve assemblies 110, 210 is greater than or equal to approximately five pounds.

Figure 3:
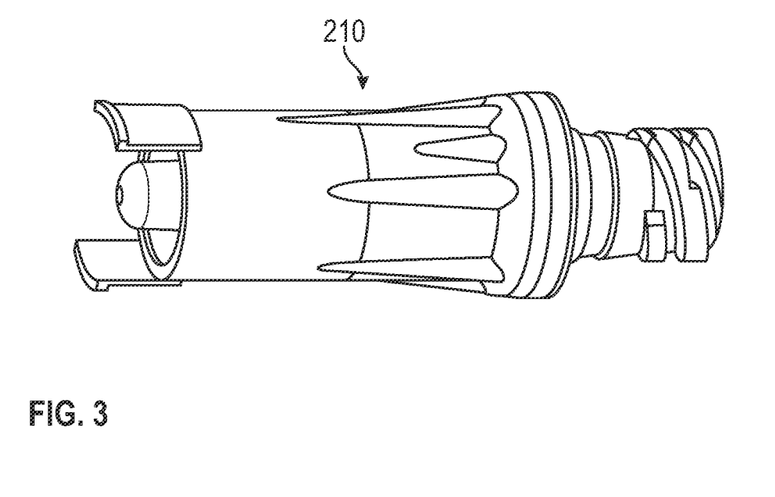
FIG. 3 illustrates perspective view of the fluid connector system of FIG. 2, in accordance with aspects of the present disclosure.

When the first and second valve assemblies 110, 210, separate from each other, as illustrated in FIG. 3, the respective first and second valve assemblies 110, 210 can resist a fluid flow therethrough. In some embodiments of the present disclosure, each of the first and second valve assemblies 110, 210 can resist fluid flow by obstructing a fluid passage through their respective assemblies.

Figure 4:
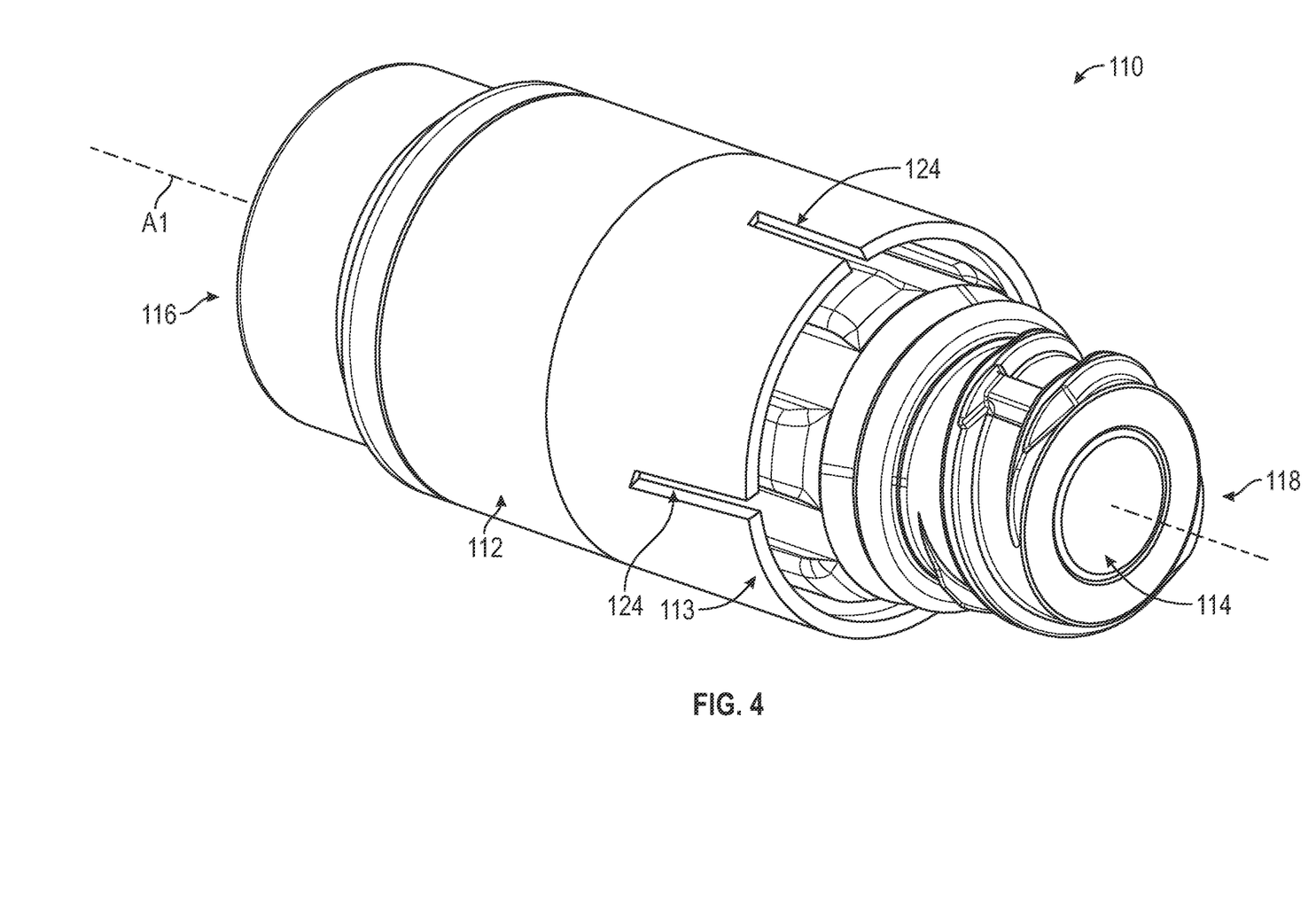
FIG. 4 illustrates perspective view of a first valve assembly of the fluid connector system, in accordance with aspects of the present disclosure.
Figure 5:
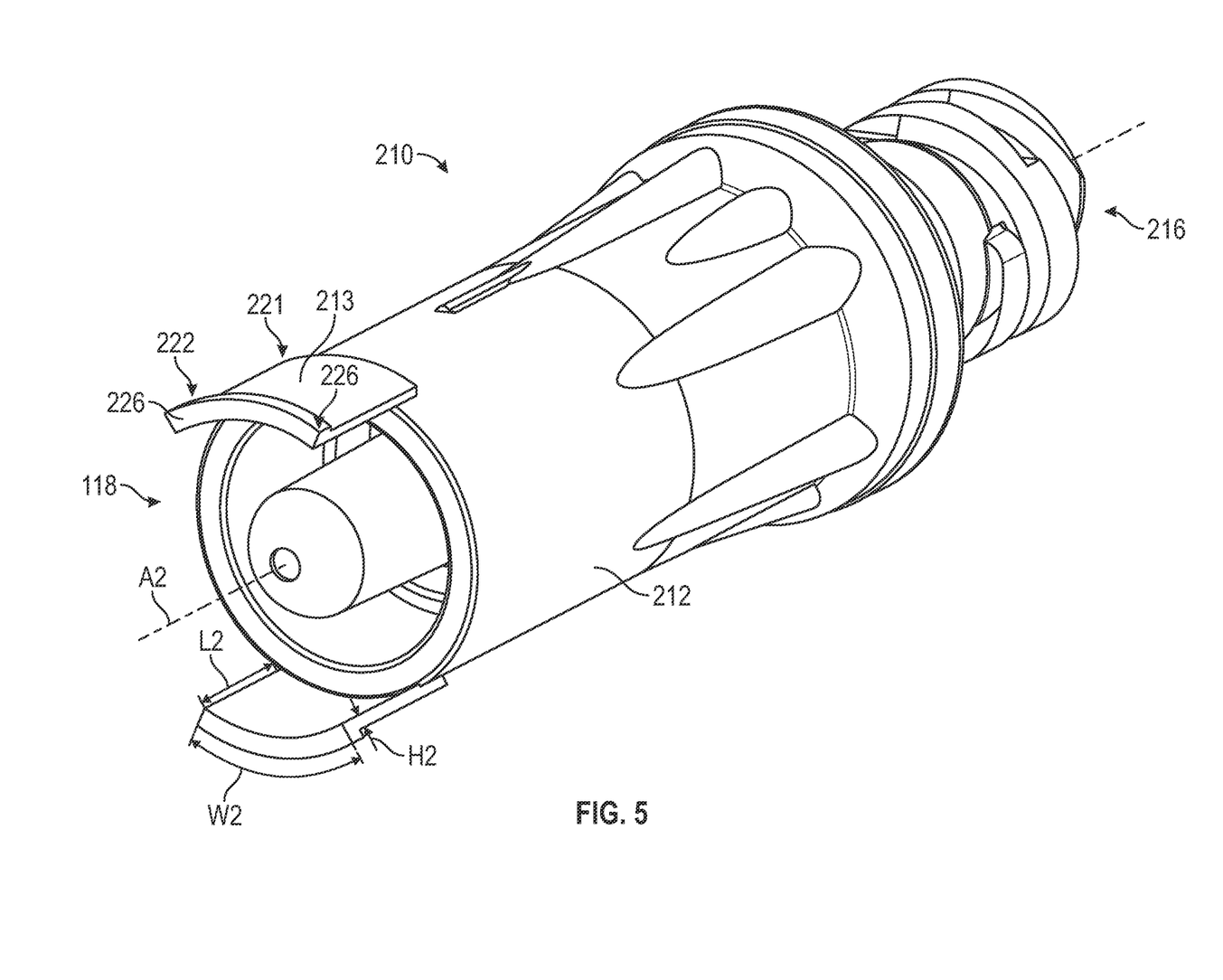
FIG. 5 illustrates perspective view of a second valve assembly of the fluid connector system, in accordance with aspects of the present disclosure.

The first valve assembly 110 includes a housing 112 having a first port, a second port, and an inner surface forming a channel that extends between the first and second ports. A valve element 114 is positioned in the channel of the first valve assembly 110 to resist or permit a fluid flow through the channel. When the first valve assembly 110 is not coupled with the second valve assembly 210 or other mating connector, as shown in at least FIG. 4, the valve element 114 is in a first position. In the first position, the channel through the first valve assembly 110 is obstructed by the valve element 114 to resist fluid flow through the first valve assembly 110.

Figure 7:
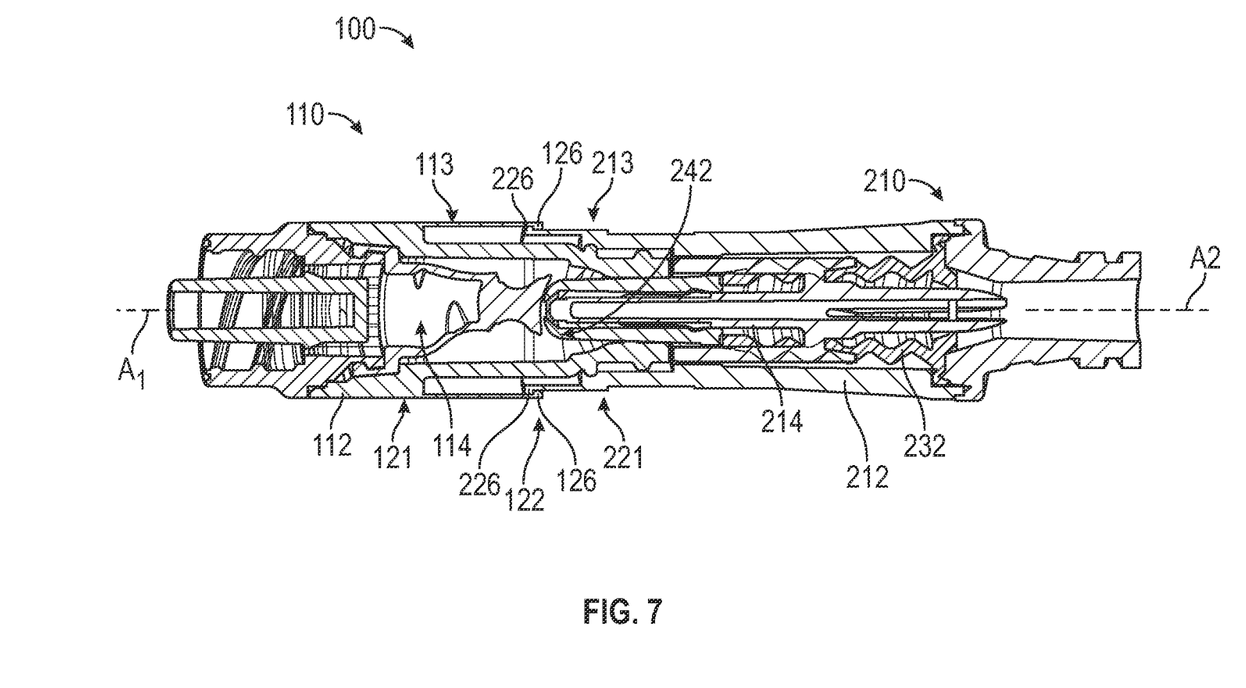
FIG. 7 illustrates a cross-sectional view of the fluid connector system of FIG. 2, in accordance with aspects of the present disclosure.

When the first valve assembly 110 is coupled with the second valve assembly 210, as shown in at least FIGS. 2 and 7, the valve element 114 is moved to a second position. In the second position, the channel through the first valve assembly 110 is unobstructed to reduce the resistance to a fluid flow through the channel of the first valve assembly 110.

The second valve assembly 210 includes a body 212 having a first port, a second port, and an inner surface forming a channel that extends between the first and second ports. A post 214 is positioned in the channel of the second valve assembly 210. When the second valve assembly 210 is not coupled with the first valve assembly 110, or another mating connector, the channel through the second valve assembly 210 is obstructed by the post 214.

When the first and second valve assemblies 110, 210 are coupled together, a portion of the first valve assembly 110 moves or biases the post 214 of the second valve assembly 210 to fluidly couple the channel through the first valve assembly 110 with the channel through the second valve assembly 210, as shown in at least FIG. 7.

To resist unintentional separation of the first and second valve assemblies 110, 210 from each other, any of the first and second valve assemblies 110, 210 includes an arm configured to engage a portion of the other of the first and second valve assemblies 110, 210. When the first and second valve assemblies 110, 210 are pulled or move in a direction away from each other, the arm engages a portion of the first or second valve assemblies 110, 210 to resist separation thereof.

In some embodiments, the first valve assembly 110 includes a sleeve 113 that extends from an outer surface of the housing to form a passage between the outer surface of the housing and an inner surface of the sleeve. The passage is configured to receive a portion of the second valve assembly 210 when the first and second valve assemblies 110, 210 are coupled together. In some embodiments, the second valve assembly 210 includes one or more arm 213 that extends from the body. The one or more arm 213 are configured to be inserted into the passage of the first valve assembly 110 when the first and second valve assemblies 110, 210 are coupled together. When the first and second valve assemblies 110, 210 are pulled or moved in a direction away from each other, at least a portion of the one or more arm 213 engages a portion of the sleeve 113 to resist separation of the first and second valve assemblies 110, 210.

Figure 6:
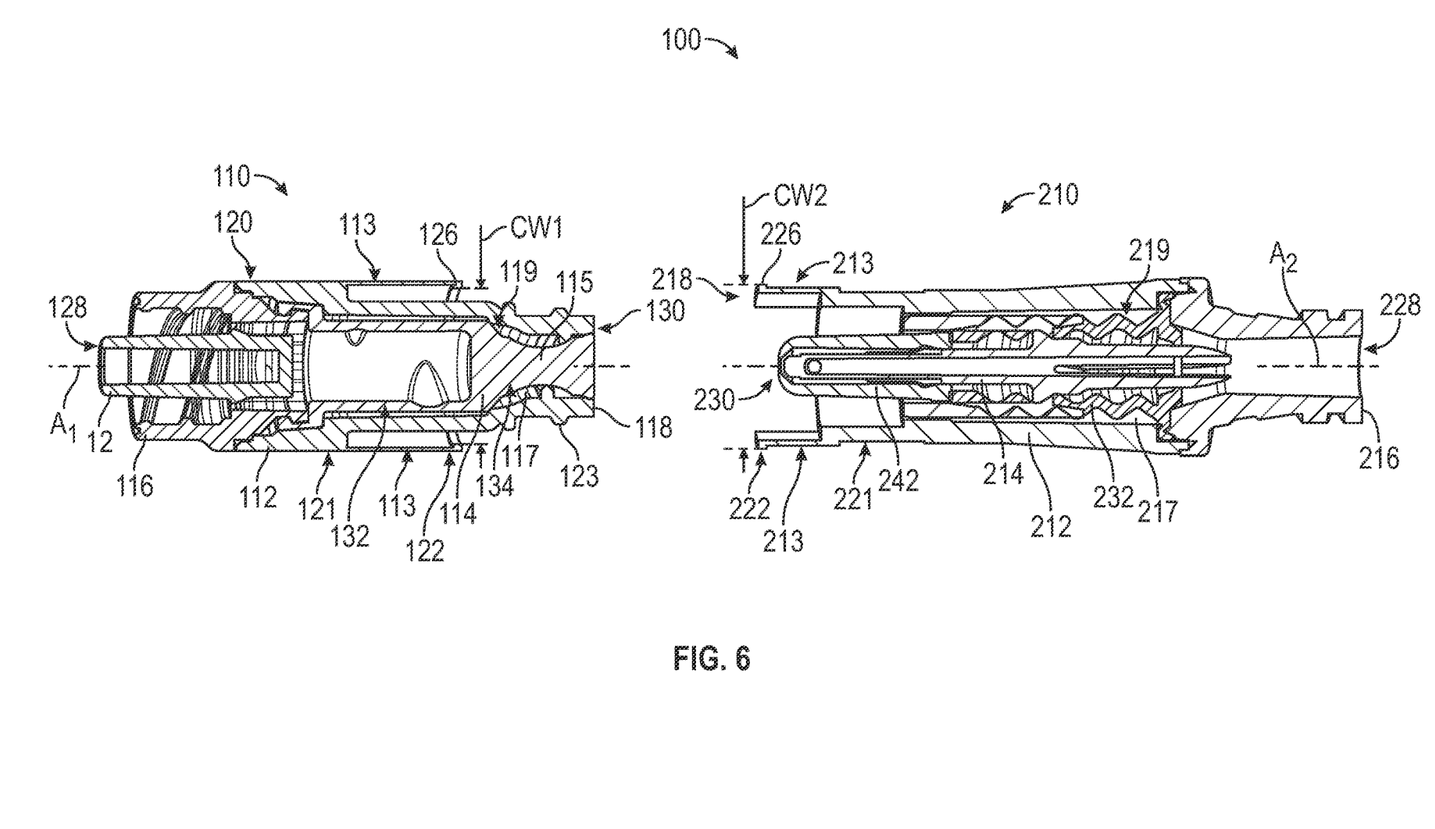
FIG. 6 illustrates a cross-sectional view of the fluid connector system of FIG. 3, in accordance with aspects of the present disclosure.

Cross-sectional views of the fluid connector system 100 shown illustrated in FIGS. 6 and 7. The first valve assembly 110 includes a housing 112 having a first end 116 and a second end 118. The first end 116 of the housing forms a first port 128, the second end 118 of the housing forms a second port 130, and an inner surface 117 of the housing forms a channel 119 that at extends between the first and second ports 128, 130. The channel 119, the first port 128, and the second port 130 define a fluid passage through the first valve assembly 110.

In some aspects of the present disclosure, the first end 116 of the body defines a male luer structure 142 that extends in a direction away from the second end 118 and is fluidly coupled to channel 119. The male luer structure 142 forms at least portion of the fluid passage through the first valve assembly 110. In some embodiments of the present disclosure, the first end 116 of the first valve assembly 110 can include any of a bond pocket, a female luer, and/or a male luer.

A sleeve 113 extends from an outer surface 120 of the housing and is configured to engage against the second valve assembly 210. The sleeve includes a proximal end 121 coupled to the housing 112 and a distal end 122 that is opposite to the proximal end 121. The sleeve 113 extends in a direction toward the second end 118 of the first valve assembly so that a cavity is formed between an inner surface of the sleeve 113 and the outer surface 120 of the housing. The cavity between the inner surface of the sleeve 113 and the outer surface 120 of the housing is configured to receive a portion of the second valve assembly 210 therein when the first and second valve assemblies 110, 210 are coupled together.

In some embodiments of the present disclosure, the proximal end 121 of the sleeve is positioned between the first and second ends 116, 118 of the housing, and the distal end 122 is adjacent to the second end 118 of the housing. In some aspects of the present disclosure, the distal end 122 of the sleeve is positioned between the first and second ends 116, 118 of the housing, however it is also contemplated that the distal end 122 of the sleeve can extend beyond or past the second end 118 of the housing.

In some embodiments of the present disclosure, a width of the sleeve 113 extends around a perimeter of the outer surface of the housing 112. The width of the sleeve can be such that the sleeve 113 extends around the entire perimeter of the housing 112. In some embodiments the sleeve 113 is discontinuous around the perimeter of the housing 112 such that one or more sleeve 113 extends from the housing 112.

In some aspects of the present disclosure, a perimeter of the sleeve 113 that extends along the distal end 122 thereof is discontinuous. The discontinuous perimeter of the sleeve 113 can be formed by a notch 124 that extends through the distal end 122 in a direction toward the proximal end 121 of the sleeve. The discontinuous perimeter of the sleeve 113 con permit the distal end 122 of the sleeve to bias or move toward and/or away from the outer surface of the housing 112.

The sleeve 113 includes a ridge 126 configured to engage against a portion of the second valve assembly 210 and resist unintentional separation of the first valve assembly 110 from the second valve assembly 210. The ridge 126 extends from the sleeve toward the outer surface 120 of the housing to form an innermost surface of the sleeve.

The innermost surface of the sleeve at the ridge 126 defines a cross-sectional width CW1 of the sleeve 113. The cross-sectional width CW1 of the sleeve 113 can be selected such that the engagement of the ridge 126 against the second valve assembly 210 causes a portion of the sleeve 113 to bias or move in a direction away from the housing 112. In some aspects of the present disclosure, the distal end 122 of the sleeve is configured to move relative to the outer surface 120 of the housing in a direction that is toward and/or away from a longitudinal axis A1 defined between the first and second ends 116, 118 of the housing.

The ridge 126 can be formed by any of a continuous or a discontinuous ridge that extends form a surface of the housing. In some aspects, the ridge 126 can be formed by a channel or groove that extends along the inner surface of the sleeve. In still some aspects, the ridge can extend from an inner surface of the sleeve 113 in a direction toward the longitudinal axis A1 and/or can extends from an outer surface of the sleeve 113 in a direction away the longitudinal axis A1.

A compressible element 114 is positioned in the cavity and is configured to resist fluid flow through the fluid passage through the first valve assembly 110 when the compressible element 114 is in a first position. A fluid flow through the fluid passage through the first valve assembly 110 is resisted by a portion of the compressible element 114 positioned in the second port 130. In some embodiments of the present disclosure, a head portion 115 of the compressible element is positioned within the second port 130 when the compressible element 114 is in a first position.

The compressible element 114 includes a proximal portion forming a valve base 132 and a distal portion forming a valve head 134. In some embodiments of the present disclosure, the valve base 132 is configured to collapse or fold when the valve head 134 is displaced from the second port 130 into the channel 119. In some aspects of the present disclosure, the valve base 132 comprises a wall having an inner surface forming a cavity within the compressible element 114. The cavity extends through an outer surface of the collapsible valve 114 at the proximal portion in a direction toward the valve head 134.

In accordance with some embodiments, an outer surface of the housing 112 proximal to the second end 118 comprises a thread 123 that extends along the outer surface of the housing 112. The thread 123 can permit coupling of the first valve assembly 110 with another device to permit injection of a fluid into the first valve assembly 110 or removal of a fluid from the first valve assembly 110. In some instances, the thread 123 can permit couple of the first valve assembly with a needleless syringe, a fluid line, or another valve assembly.

The second valve assembly 210 includes a body 212 having a first end 216 and a second end 218. The first end 116 of the housing forms a first port 228, the second end 218 of the body forms a second port 230, and an inner surface 217 of the housing forms a channel 219 that extends between the first and second ports 228, 230. The channel 219, the first port 228, and the second port 230 define a fluid passage through the second valve assembly 210.

In some aspects of the present disclosure, the second end 218 of the body defines a male luer structure 242 that is configured to be positioned in the second port 130 of the first valve assembly 110 when the first and second valve assemblies 110, 210 are coupled together.

A distal end of the male luer structure 242 forms the second port 230 and the channel 219 of the second valve assembly extends through the first port 228, the channel 219, and the second port 230. When the first and second valve assemblies 110, 210 are coupled together, the channel 119 of the first valve assembly 110 and the channel 219 of the second valve assembly are fluidly coupled together.

A post 214 is positioned in the channel 219 and is configured to resist a fluid flow though the fluid passage through the second port 230. The post 214 is movable toward and away from the second port 230, so that in a closed configuration, the post 214 obstructs the second port 230, and in an open configuration, the post 214 is moved away from the second port 230 to permit a fluid flow therethrough.

To urge the post 214 toward the second port 230, the second valve assembly 210 includes a biasing element 232 positioned between the post 214 and the first port 228. When the second valve assembly 210 is moved toward the first valve assembly 110, a portion of the post 214 is configured to engage against the first valve assembly 110 to move or displace the post in a direction away from the second port 230. As the post is moved away from the second port 230, the biasing element 232 is compressed. The biasing element 232 can be formed by any structure configured to urge the post 214 in a first direction and to be biased or compressed in a second direction that is different than the first direction. In some instances, the biasing element 232 can be a bellows or a spring.

In some embodiments of the present disclosure, an inner surface of the post 214 can form a fluid passage that extends through the post. In the closed configuration, the fluid passage of the post 214 is isolated from the second port 230, and in the open configuration, the fluid passage of the post 214 is fluidly coupled to the second port 230 so that a fluid can move between the first and second ports 228, 230 by moving through the channel 219 and the fluid passage of the post 214.

One or more arm 213 extends from the body 212 and is configured to engage against the first valve assembly 110 to form a snap fitting feature. The one or more arm 213 includes a proximal end 221 coupled to the body 212 and a distal end 222 that is opposite to the proximal end 221. The one or more arm 213 extends in a direction away from the first end 216 to form the second end 218 of the second valve assembly. When the first and second valve assemblies 110, 210 are coupled together, the one or more arm 213 is received into the cavity formed between the inner surface of the sleeve 113 and the outer surface 120 of the housing of the first valve assembly 110.

The one or more arm 213 can be shaped so that at least the distal end 222 end is cantilevered from the body 212. The cantilevered portion of the one or more arm 213 extends in a first direction from the body 212 to form a length L2. The one or more arm 213 further includes a width W2 that extends in a direction that is transverse, relative to the width W2.

In some embodiments of the present disclosure, the first direction defining the length L1 of the one or more arm is approximately parallel to a longitudinal axis A2 that extends between the first and second ports 228, 230, and the second direction defining the width W2 of the one or more arm is transverse to the longitudinal axis A2.

The length L2 can be between approximately about 0.19 inch (5 mm) to about 0.31 inch (8 mm). In some embodiments, the length L2 is approximately 0.31 inch (8 mm). the width W2 can be between approximately 0.07 inches (2 mm) to about 0.19 inch (5 mm). In some embodiments, the width W2 is approximately 0.06 inch (1.5 mm).

The one or more arm 213 includes a protrusion 226 configured to engage against the ridge 126 of the first valve assembly 110 and resist unintentional separation of the first valve assembly 110 from the second valve assembly 210.

The protrusion 226 extends from the one or more arm 213 in a direction away from the longitudinal axis A2. The protrusion 226 extends from the one or more arm 213 to define a height H2 of the protrusion. The height H2 can be between approximately 0.039 inch (1 mm) to about 0.08 inch (2 mm). In some embodiments of the present disclosure, the height H2 is approximately 0.039 inch (1 mm).

A cross-sectional width CW2 of the one or more arms 213 can be defined between distal ends of a first arm and a second arm. The cross-sectional width CW2 of the arms 213 can be approximately equal to or larger than the cross-sectional width of the sleeve 113, so that engagement of the protrusion 226 of the second valve assembly against the ridge 126 of the first valve assembly causes the sleeve 113 to bias or move in a direction away from the housing 112 and/or causes one or more arm 213 to bias or move in a direction toward the body 212.

A cross-sectional view of the first and second valve assemblies 110, 210 coupled together is shown in FIG. 7.

To couple the first and second valve assemblies 110, 210 together, any of the first valve assembly 110 and the second valve assembly 210 are moved toward each other. As the first and second valve assemblies 110, 210 are moved toward each other, the male luer structure 242 of the second valve assembly can engaged against and displace or compress the compressible element 114. Further, the post 214 can engage against the first valve assembly 110 to move or displace the post 214.

When the first and second valve assemblies 110, 210 are coupled together, the compressible element 114 of the first valve assembly is moved or compressed away from the second port 130 to open the fluid passage through the first valve assembly 110, and the post 214 of the second valve assembly is moved or displaced away from the second port 230.

When the first valve assembly 110 and the second valve assembly 210 are moved toward each other, the one or more arm 213 of the second valve assembly can engage against the sleeve 113 of the first valve assembly. Further movement of the first and second valve assemblies 110, 210 toward each other can cause any of the one or more arm 213 and the sleeve 113 to bias or move away from each other, thereby permitting the one or more arm 213 to be received into the cavity formed between the inner surface of the sleeve 113 and the outer surface 120 of the housing of the first valve assembly 110.

When the first and second valve assemblies 110, 210 are coupled together, the protrusion 226 is positioned between the ridge 126 and the proximal end 121 of the sleeve, and the ridge 126 is positioned between the protrusion 226 and the proximal end 221 of the respective arm 213.

The first and second valve assemblies 110, 210 are retained together by engagement of the sleeve 113 and the one or more arm 213 against each other, thereby creating a snap fitting feature. If any of the first and second valve assemblies 110, 210 are pulled in a direction away from each other, the ridge 126 and the protrusion 226 can engage against each other to resist separation of the first and second valve assemblies 110, 210. If a threshold force against any of the ridge 126 and the protrusion 226 is exceeded, the sleeve 113 and/or one or more arm 213 can bias or move away from each other.

Figure 8A:
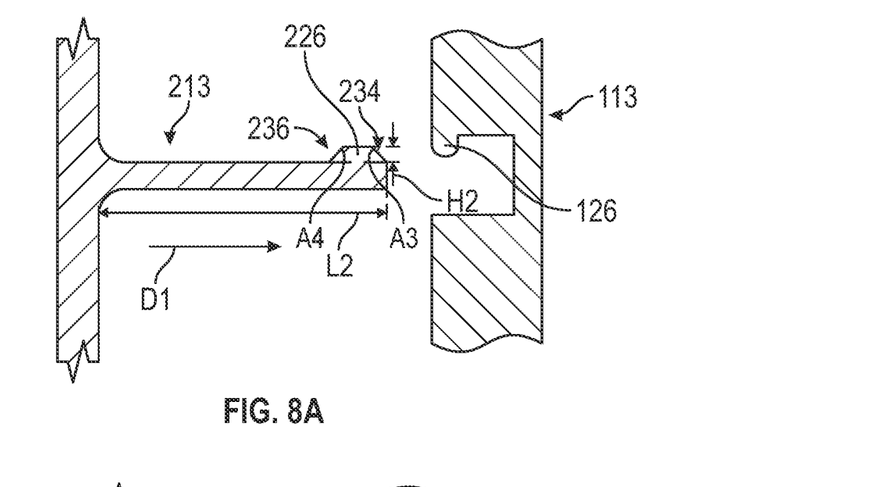
FIGS. 8A-8C illustrate detail views of snap fitting features of the fluid connector system, in accordance with aspects of the present disclosure.
Figure 8B:
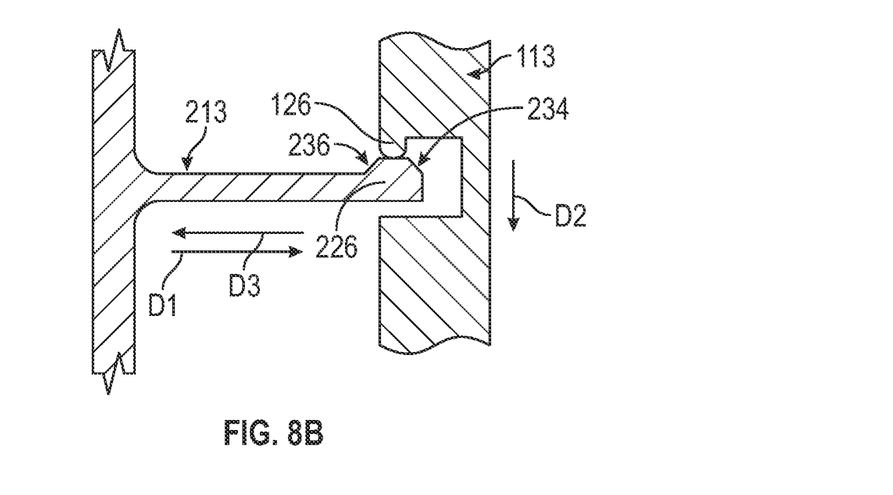
Figure 8C:
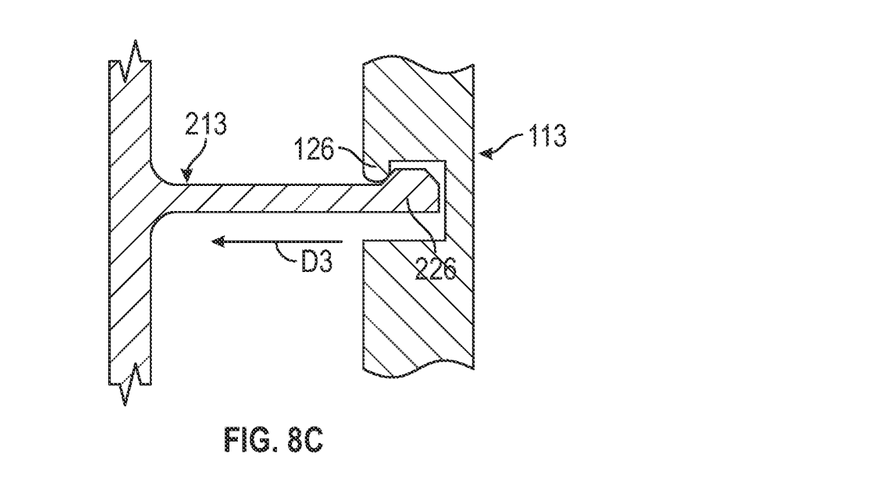

A detailed view of the one or more arm 213 and the sleeve 113 are shown, for example, in FIGS. 8A-8C. As the first and second valve assemblies 110, 210 are moved in a first direction D1 toward each other, the one or more arm 213 of the second valve assembly approaches the sleeve 113 of the first valve assembly, as shown in FIG. 8A.

As the first and second valve assemblies 110, 210 are moved toward each other, the one or more arm 213 and the sleeve 113 can engage against each other, as shown in FIG. 8B. Upon contact or engagement of the one or more arm 213 against the sleeve 113, the one or more arm 213 can deflect or bias to move in a second direction D2, where the second direction D2 is transverse, relative to the first direction D1. It should be understood that the present disclosure contemplates that upon engagement of the one or more arm 213 against the sleeve 113, any of the one or more arm 213 and the sleeve 113 can deflect or bias to move away from each other.

After the first and second valve assemblies 110, 210 are moved toward each other such that the protrusion 226 is positioned beyond or past the ridge 126, the one or more arm 213 can un-bias and move to return to a neutral position, as shown in FIG. 8C.

When the first and second valve assemblies 110, 210 are moved in a third direction D3 away from each other, where the third direction D3 is different than or approximately opposite to the first direction D1, the protrusion 226 can engage against the ridge 126 to cause any of the one or more arm 213 and the sleeve 113 can deflect or bias and move away from each other.

In some embodiments of the present disclosure, the protrusion 226 can include a first end surface 234 and a second end surface 236, where the first and second end surfaces 234, 236 are configured to engage against the sleeve 113 or a portion thereof, such as the ridge 126 of the sleeve.

The first and second end surfaces 234, 236 are oriented opposite to each other and extend in a direction away from the one or more arm 213. The first end surface 234 is configured to engage against a first portion of the sleeve 113, such as the ridge 126, when the first and second valve assemblies 110, 210 are moved toward each other for assembly. The second end surface 236 is configured to engage against second portion of the sleeve 113 that is different than the first portion when the first and second valve assemblies 110, 210 are moved away from each other or are being separated.

In some aspects of the present disclosure, the first end surface 234 extends away from the one or more arm 213 at a first angle A3, and the second end surface 236 extends away from the one or more arm 213 at a second angle A4. The first and second angles A3, A4 can be approximately equal to each other or can be different. In some embodiments of the present disclosure, the first and second angles A3, A4 are between approximately 40-70 degrees relative to the direction of the length L2 of the respective one or more arm 213. In some instances of the present disclosure, the first and second angles A3, A4 of the first and second end surfaces 234, 236 is approximately 40 degrees.

The first and second angles A3, A4 of protrusion 226 can be configured to have increased resistance to movement of the one or more arm 213, relative to the sleeve 113, in any of the first or third directions D1, D3, relative to the other of the first or third directions D1, D3. The first and second angles A3, A4 of protrusion 226 can be configured to have increased or different resistance to movement of the one or more arm 213 when the first angle A3 is different than the second angle A4. In some embodiments of the present disclosure, the second angle A4 is greater than the first angle A3, such that resistance to movement of the one or more arm 213 in the third direction D3 (e.g., when the first and second valve assemblies 110, 210 are moved away from each other) is greater than the resistance to movement of the one or more arm 213 in the first direction D1 (e.g., when the first and second valve assemblies 110, 210 are moved toward each other).

Although the present disclosure includes embodiments in which the first valve assembly comprises a sleeve and the second valve assembly comprises on ore more arm, it should be understood that any of the first and valve assemblies can comprise a sleeve and/or one or more arm configured to engage against a sleeve and/or one or more arm of the second valve assembly.

The features of the present disclosure provide first and valve assemblies that can be coupled together to form a fluid pathway therebetween. When coupled together, the features of the present disclosure resist unintentional separation between the first and valve assemblies. However, if the first and valve assemblies are separated, wither unintentionally or intentionally, the fluid pathway for each of the first and valve assemblies become closed or obstructed to prevent fluid loss therefrom. The features of the present disclosure asl provide that upon separation of the first and second valve assemblies, any of the first and valve assemblies can be cleaned and disinfected, and the first and second valve assemblies can be once again coupled together to form a fluid pathway therebetween.

Illustration of Subject Technology as Clauses

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1 or clause 5. The other clauses can be presented in a similar manner.

Clause 1. A fluid connector system comprising: a first valve assembly comprising: a housing having a first port, a second port, an inner surface forming a channel that extends between the first and second ports, and a sleeve that extends from an outer surface of the housing, the sleeve having an inner surface comprising a ridge that extends in a direction toward the housing; and a valve element having a base and a head, wherein the valve element is positioned within the channel such that the head obstructs the channel through the first port when the first valve assembly is in a closed configuration, and the head is moved away from the first port, in a direction toward the second port, to permit a fluid flow through the channel when the first valve assembly is in an open configuration; a second valve assembly comprising: a body having a first port, a second port, an inner surface forming a channel that extends between the first and second ports, and one or more arm that extends from the body, the one or more arm having an outer surface comprising a protrusion that extends in a direction away from the outer surface of the body; a post positioned in the channel and movable between the first and second ports; and a biasing element positioned between the post and the second port, such that the post is urged toward the first port to obstructs the channel through the first port when the second valve assembly is in a closed configuration, and the post is moved away from the first port, in a direction toward the second port, to compress the biasing element and permit a fluid flow through the channel when the second valve assembly is in an open configuration; wherein, when the first and second valve assemblies are coupled together, the one or more arm is positioned between the inner surface of the sleeve and the outer surface of the body, and the protrusion is positioned between the ridge and the second port of the first valve assembly, such that engagement of the protrusion against the ridge resists separation of the first and second valve assemblies.

Clause 2. The fluid connector system of Clause 1, wherein an outermost surface of the one or more arm comprises a first cross-sectional width, and an innermost surface of the sleeve comprises a second cross-sectional width, and wherein the first cross-sectional width is larger than the second cross-sectional width.

Clause 3. The fluid connector system of any one of Clauses 1 and 2, wherein the sleeve comprises a distal end having a discontinuous perimeter.

Clause 4. The fluid connector system of Clause 3, wherein the discontinuous perimeter of the sleeve is formed by a notch extending through the sleeve at the distal end thereof.

Clause 5. The fluid connector system of any one of Clauses 1 to 4, wherein the outer surface of the housing comprises a thread proximal to the first port.

Clause 6. The fluid connector system of any one of Clauses 1 to 5, wherein the ridge of the sleeve is formed by a groove that extends into the inner surface of the sleeve, in a direction away from a longitudinal axis defined between the first and second ports of the housing.

Clause 7. The fluid connector system of any one of Clauses 1 to 6, wherein the one or more arm comprises a first arm and a second arm, and wherein the first and second arms are circumferentially spaced apart around a longitudinal axis defined between the first and second ports of the body.

Clause 8. The fluid connector system of any one of Clauses 1 to 7, wherein protrusion comprises a height from the outer surface of the body to a distal end of the protrusion, and wherein the height is between approximately 0.39 inch (1 mm) to about 0.08 inch (2 mm).

Clause 9. The fluid connector system of Clause 8, wherein the height of the protrusion is approximately 0.39 inch (1 mm).

Clause 10. The fluid connector system of any one of Clauses 1 to 9, wherein protrusion comprises a first end surface and a second end surface, and wherein any of the first and second end surfaces extends away from the arm at an angle that is between approximately 40-70 degrees relative to the arm.

Clause 11. The fluid connector system of Clause 10, wherein any of the first and second end surfaces extends away from the arm at an angle that is between approximately 40 degrees relative to the arm.

Clause 12. The fluid connector system of any one of Clauses 1 to 11, wherein the one or more arm comprises a length from the body to a distal end of the one or more arm, and wherein the length is between approximately 0.19 inch (5 mm) to about 0.31 inch (8 mm).

Clause 13. The fluid connector system of Clause 12, wherein the length of the one or more arm is approximately 0.31 inch (8 mm).

Clause 14. The fluid connector system of any one of Clauses 1 to 13, wherein the one or more arm comprises a width that extends circumferentially around a longitudinal axis defined between the first and second ports of the body, and wherein the width is between approximately 0.07 inches (2 mm) to about 0.19 inch (5 mm).

Clause 15. The fluid connector system of Clause 14, wherein the width of the one or more arm is approximately 0.06 inch (1.5 mm).

Clause 16. A fluid connector system comprising: a first valve assembly comprising: a housing having a first port, a second port, an inner surface forming a channel that extends between the first and second ports, and a sleeve extending along and spaced apart from an outer surface of the housing; and a valve positioned in the channel and configured to obstruct a portion of the channel through the first port; and a second valve assembly comprising: a body having a first port, a second port, an inner surface forming a channel that extends between the first and second ports, and one or more arm that extends from the body, the one or more arm having an outer surface comprising a protrusion that extends in a direction away from the outer surface of the body.

Clause 17. The fluid connector system of Clause 16, wherein the sleeve comprises a ridge that extends toward a longitudinal axis defined between the first and second ports of the housing.

Clause 18. The fluid connector system of any one of Clauses 16 and 17, wherein an outermost surface of the one or more arm comprises a first cross-sectional width, and an innermost surface of the sleeve comprises a second cross-sectional width, and wherein the first cross-sectional width is larger than the second cross-sectional width.

Clause 19. The fluid connector system of any one of Clauses 16 to 18, wherein the sleeve comprises a distal end having a discontinuous perimeter.

Clause 20. The fluid connector system of any one of Clauses 16 to 19, wherein the one or more arm comprises a first arm and a second arm, and wherein the first and second arms are circumferentially spaced apart around a longitudinal axis defined between the first and second ports of the body.

Clause 21. A method providing a fluid connector system, the method comprising: providing a first valve assembly comprising a housing having a first port, a second port, an inner surface forming a channel that extends between the first and second ports, and a sleeve that extends from an outer surface of the housing; providing a second valve assembly comprising a body having a first port, a second port, an inner surface forming a channel that extends between the first and second ports, and one or more arm that extends from the body; and moving the first and second valve assemblies toward each other such that the first port of the first valve assembly engages against the first port of the second valve assembly, and the one or more arm of the body is inserted between the outer surface of the housing and the sleeve.

Clause 22. The method of Clause 21, further comprising moving the first and second valve assemblies toward each other until a protrusion of the one or more arm is positioned between a ridge of the sleeve and the second port of the housing.

FURTHER CONSIDERATIONS

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A fluid connector system comprising: a first valve assembly comprising: a housing having a first port, a second port, an inner surface forming a channel that extends between the first and second ports, and a sleeve that extends along and spaced apart from an outer surface of the housing, the sleeve having an inner surface comprising a ridge at a distal end portion of the sleeve and extending in a direction toward the housing; and a valve element having a base and a head, wherein the valve element is positioned within the channel such that the head obstructs the channel through the second port of the housing when the first valve assembly is in a closed configuration, and the head is moved away from the second port of the housing, in a direction toward the first port of the housing, to permit a fluid flow through the channel when the first valve assembly is in an open configuration; a second valve assembly comprising: a body having a first port, a male luer structure forming a second port, and an inner surface forming a channel that extends between the first and second ports, and one or more arm that extends from the body in a direction away from the first port of the body and along the male luer structure, the one or more arm having an outer surface comprising a protrusion at a distal end portion of the one or more arm and extending in a direction away from the outer surface of the body and an inner surface spaced apart from an outer surface of the male luer structure; a post positioned in the channel and movable between the first and second ports of the body; and a biasing element positioned between the post and the first port of the body, such that the post is urged toward the second port of the body to obstruct the channel through the second port of the body when the second valve assembly is in a closed configuration, and the post is moved away from the second port of the body, in a direction toward the first port of the body, to compress the biasing element and permit a fluid flow through the channel when the second valve assembly is in an open configuration; wherein, when the first and second valve assemblies are coupled together, the one or more arm is positioned between the inner surface of the sleeve and the outer surface of the housing, and the protrusion is positioned between the ridge and the second port of the housing, such that engagement of the protrusion against the ridge resists separation of the first and second valve assemblies.

2. The fluid connector system of claim 1, wherein an outermost surface of the one or more arm comprises a first cross-sectional width, and an innermost surface of the sleeve comprises a second cross-sectional width, and wherein the first cross-sectional width is larger than the second cross-sectional width.

3. The fluid connector system of claim 1, wherein the sleeve comprises a distal end having a discontinuous perimeter.

4. The fluid connector system of claim 3, wherein the discontinuous perimeter of the sleeve is formed by a notch extending through the sleeve at the distal end thereof.

5. The fluid connector system of claim 1, wherein the outer surface of the housing comprises a thread proximal to the second port of the housing.

6. The fluid connector system of claim 1, wherein the ridge of the sleeve is formed by a groove that extends into the inner surface of the sleeve, in a direction away from a longitudinal axis defined between the first and second ports of the housing.

7. The fluid connector system of claim 1, wherein the one or more arm comprises a first arm and a second arm, and wherein the first and second arms are circumferentially spaced apart around a longitudinal axis defined between the first and second ports of the body.

8. The fluid connector system of claim 1, wherein the protrusion comprises a height from the outer surface of the body to a distal end of the protrusion, and wherein the height is between approximately 0.039 inch (1 mm) to about 0.08 inch (2 mm).

9. The fluid connector system of claim 8, wherein the height of the protrusion is approximately 0.039 inch (1 mm).

10. The fluid connector system of claim 1, wherein the protrusion comprises a first end surface and a second end surface, and wherein any of the first end surface and the second end surface extends away from the arm at an angle that is between approximately 40-70 degrees relative to the arm.

11. The fluid connector system of claim 10, wherein any of the first and second end surfaces extends away from the arm at an angle that is between approximately 40 degrees relative to the arm.

12. The fluid connector system of claim 1, wherein the one or more arm comprises a length from the body to a distal end of the one or more arm, and wherein the length is between approximately 0.19 inch (5 mm) to about 0.31 inch (8 mm).

13. The fluid connector system of claim 1, wherein the one or more arm comprises a width that extends circumferentially around a longitudinal axis defined between the first and second ports of the body, and wherein the width is between approximately 0.07 inches (2 mm) to about 0.19 inch (5 mm).

14. A fluid connector system comprising: a first valve assembly comprising: a housing having a first port, a second port, an inner surface forming a channel that extends between the first and second ports of the housing, and a sleeve extending along and spaced apart from an outer surface of the housing, a distal end portion of the sleeve comprising a ridge; and a valve positioned in the channel and configured to obstruct a portion of the channel through the second port of the housing; and a second valve assembly comprising: a body having a first port, a male luer structure forming a second port, an inner surface forming a channel that extends between the first and second ports, and a post that is positioned in the channel along the male luer structure and urged toward the second port of the body by a biasing element between the post and the first port, and one or more arm that extends from the body and along the male luer structure, the one or more arm having an outer surface and an inner surface, the inner surface of the one or more arm spaced apart from an outer surface of the male luer structure, and the outer surface of the one or more arm having a distal end portion comprising a protrusion configured to engage against the ridge of the sleeve when the second port of the body is engaged against the second port of the housing.

15. The fluid connector system of claim 14, wherein the ridge extends toward a longitudinal axis defined between the first and second ports of the housing.

16. The fluid connector system of claim 14, wherein an outermost surface of the one or more arm comprises a first cross-sectional width, and an innermost surface of the sleeve comprises a second cross-sectional width, and wherein the first cross-sectional width is larger than the second cross-sectional width.

17. The fluid connector system of claim 14, wherein the sleeve comprises a distal end having a discontinuous perimeter.

18. The fluid connector system of claim 14, wherein the one or more arm comprises a first arm and a second arm, and wherein the first and second arms are circumferentially spaced apart around a longitudinal axis defined between the first and second ports of the body.

19. A method providing a fluid connector system, the method comprising: providing a first valve assembly comprising a housing having a first port, a second port, an inner surface forming a channel that extends between the first and second ports of the housing, and a sleeve that extends from an outer surface of the housing, the sleeve having an inner surface comprising a ridge at a distal end portion of the sleeve; providing a second valve assembly comprising a body having a first port, a male luer structure forming a second port, an inner surface forming a channel that extends between the first and second ports of the body, and a post that is positioned in the channel along the male luer structure and is urged toward the second port of the body by a biasing element between the post and the first port, and one or more arm that extends from the body with an inner surface of the one or more arm spaced apart from an outer surface of the male luer structure, and an outer surface of the one or more arm comprising a distal end portion having a protrusion; and moving the first and second valve assemblies toward each other such that the second port of the housing engages against the second port of the body, and the protrusion of the one or more arm of the body is inserted between the outer surface of the housing and the inner surface of the sleeve.

20. The method of claim 19, further comprising moving the first and second valve assemblies toward each other until the protrusion of the one or more arm is positioned between the ridge of the sleeve and the second port of the housing.

* * * * *